United States Patent Office 3,169,944
Patented Feb. 16, 1965

3,169,944
PROCESS FOR REACTING A DIALKYL ESTER OF TEREPHTHALATE ACID WITH A GLYCOL AND POLYCONDENSING THE PRODUCT THEREOF
Neville Durrant Scott and Neil Munro, Harrogate, England, assignors to Imperial Chemical Industries Limited, London, England, a corporation of Great Britain
No Drawing. Filed Jan. 22, 1960, Ser. No. 4,016
Claims priority, application Great Britain, Feb. 18, 1959, 5,573/59
13 Claims. (Cl. 260—49)

This invention relates to the production, by a rapid reaction, of polyesters having improved receptivity for dyestuffs.

It is disclosed in British Patent No. 742,811 to use various soluble salts of alkaline earth metals as ester-interchange catalysts in the manufacture of highly polymeric polymethylene terephthalates. While these alkaline earth compounds have proved to be efficient catalysts, yielding polyesters of very good colour and low tendency to thermal degradation they have the disadvantage that precipitation of the metals, for example as their terephthalates, can occur during the polycondensation reaction. This imparts an undesirable cloudiness to the polyester and causes deposition of insoluble salts in the reaction vessels. The deposits can eventually be dislodged in flakes which contaminate subsequent polyester manufacture and hinder production. These shortcomings may be overcome by conversion of the alkaline earth metal into the form of a salt of an acid of phosphorus prior to polycondensation as is described in British Patent No. 802,921.

We have now found that effective dissolution of alkaline earth metals in polyesters such as polymeric polymethylene terephthalates may be achieved when, on completion of ester-interchange between a dialkyl terephthalate and the appropriate glycol, a polyfunctional compound is added wherein at least one of the functional groups constitutes an acid or ester of phosphorus or sulphur which will form a salt of the alkaline earth metal and the remaining functional group or groups are capable of reacting with the polyester forming components. In this way the alkaline earth metal salt becomes an integral part of the polyester either by copolymerisation or by addition to the ends of the polymer molecule. This technique enables high concentrations of alkaline earth metals to be used in catalysing ester-interchange and to be subsequently maintained in solution in the polyester. Rapid rates of ester-interchange are achieved in this way.

A further advantage of our process resides in the improved affinity for dyestuffs of articles, particularly fibres, fabricated from polyesters prepared in this way. This affinity, which is analogous to that produced by the introduction of sulphonate groups as described in British specification No. 826,248, is created by the presence of acid anions associated with the alkaline earth metal, the dyeing action of basic dyestuffs taking place by an ion exchange mechanism.

According to the present invention we provide an improved process for the manufacture of highly polymeric polymethylene terephthalates wherein a dialkyl ester of terephthalic acid is reacted with a glycol of the series $HO(CH_2)_nOH$ where $n$ is greater than 1 but not exceeding 10 in the presence of an alkaline earth metal compound and the product is then subjected to polycondensation in the presence of a polycondensation catalyst characterised in that, on completion of ester-interchange, the alkaline earth metal is converted, wholly or in part, to a salt of an acid of sulphur or phosphorus by the addition of a substance having formula

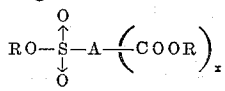

or

where A is an organic residue, R=hydrogen or alkyl, $x$ and $n=1$ or 2 and $m=3-n$. The sulphur containing additives are therefore sulphonic acids and esters such as carboxy and carboalkoxy substituted benzene sulphonic acids. Where the P—A linkage is a phosphorus-carbon linkage the phosphorus containing additive may be a phosphinic or phosphonic acid or ester such as a carboxybenzene phosphonic acid. It is also possible that the P—A linkage may be a phosphorus-oxygen linkage (when $n=1$) as in an ester of phosphoric acid such as a di(carboalkoxybenzene)phosphate. Such compounds, however, suffer from the disadvantage that ester-interchange with the terephthalate may take place at both the phosphate (P—A) and carboxylate parts of the molecule. The organic residue A is preferably aromatic, e.g. A=phenylene, but it may also be aliphatic, alicyclic or heterocyclic.

It is convenient to use esters as additives where possible, since the presence of acid at high temperatures of reaction tends to promote the undesirable formation of polyglycols by etherification. For this reason also it is preferred to add the compound of sulphur or phosphorus in amount not greater than is required to convert the alkaline earth metal to the desired salt of the acid of sulphur or phosphorus. We have also found that the alkaline earth metal is more effectively dissolved in the polyester by means of the dicarboxy acids or their esters (i.e. when $x=2$); that is to say in the form which permits the salt thus formed to be incorporated at any point in the polymer chain.

To give the rapid rates of ester-interchange of which this process is capable the quantity of alkaline earth metal should preferably be such as to give a concentration of at least 0.1 mol percent in the final polyester. It is also desirable that the ester-interchange catalyst initially added should be an oxide, hydroxide or salt of an alkaline earth metal which is readily soluble in the ester-interchange reaction mixture. We have found calcium salts of lower fatty acids such as calcium acetate very suitable for our purpose. The alkaline earth metal salts formed by interaction with the specified acids of phosphorus or sulphur are not themselves effective ester-interchange catalysts. In fact they have little influence on either the polymer forming or polymer degradation reactions and their presence in the polyester is not deleterious to colour.

The process of our invention is also suitable for the production of copolyesters, i.e. from more than two constituents. In preparing copolyesters a mixture of glycols can be used or alternatively part of the dialkyl terephthalate charge can be replaced by an ester of another dibasic acid, for example a di(carboalkoxyphenoxy)alkane.

Though the process hereinbefore described relates to the combination of alkaline earth metal compounds with certain acids and esters of phosphorus and sulphur it will be appreciated that similar reactions are readily possible with any ester-interchange catalyst having basic characteristics. Thus the alkaline earth metal compounds of our process may be replaced by alkali metal compounds, for example by using a compound, such as an acetate, of lithium, sodium or potassium. Other compounds which will function satisfactorily as ester-interchange catalysts and which will subsequently interact with our specified additives are compounds of manganese, zinc, lanthanum, aluminium and cobalt.

Polyesters prepared according to the process of our invention may be converted into shaped articles, such as fibres or films, by any known method; for example by melt extrusion. At any stage in the process of polymer formation or in the subsequent fabrication of articles therefrom pigments, such as titanium dioxide or ultramarine, or dyestuffs may be introduced.

The examples which follow, wherein all parts are by weight, are provided for the purpose of illustrating our invention:

EXAMPLES 1–12

A series of experiments have been carried out in which dimethyl terephthalate (120 parts) and ethylene glycol (97 parts) were reacted over the temperature range 150–210° C. in the presence of an alkaline earth metal compound. On completion of ester-interchange, i.e. when evolution of methanol was complete a carboxy substituted benzene sulphonic, phosphonic or phosphinic acid (or ester thereof) was added and polycondensation carried out under reduced pressure (<0.2 mm. Hg) in the temperature range 210–285° C. till a polyester having intrinsic viscosity >0.5 (1%, o-chlorophenol, 25° C.) was obtained.

Table A which follows provides details of these experiments.

In experiments 1–12 and in the comparative experiments 13–17 which follow, antimony trioxide (0.025 part) was added immediately prior to polycondensation. Alternative polycondensation catalysts, notably compounds of germanium, lanthanum and lead, have also been successfully used.

It will be observed from Table A that best results (as judged by the appearance and softening point of the polyester) have been achieved when using the alkaline earth metal and the acid or ester of sulphur in molar ratio 1:1. This is rather surprising and suggests that an ion of the type $A—SO_3Ca^+$ may be formed. Such anomalous behaviour has not been found in the acids and esters of phosphorus which we have used.

EXAMPLES 13–17 (COMPARATIVE)

These experiments, which involved the same basic procedure as in numbers 1–12, provide a comparison of the effectiveness of our process with those processes in which acids of phosphorus and sulphur, having no functional groups to allow interaction with the polymer, are used. In particular, experiment No. 17 represents polyester prepared according to a method, described in British Patent No. 802,921, which has been used in the commercial production of polyethylene terephthalate.

In experiments 14–17 the acids of phosphorus and sulphur were added in the form of concentrated aqueous solutions.

The data are presented in Table B.

Table B

| Expt. No. | Ester-interchange catalyst | Parts | Additive | Parts | Ester-interchange time (minutes) | Polyethylene terephthalate Appearance | Softening point (° C.) |
|---|---|---|---|---|---|---|---|
| 13 | Calcium acetate-1H$_2$O | 1.12 | None | | 54 | Very cloudy and contains coagulated solids. | 261 |
| 14 | ----do---- | 1.12 | Phosphoric acid | 0.67 | 54 | Cloudy and discoloured | 257 |
| 15 | ----do---- | 1.12 | Phosphorous acid | 0.56 | 54 | Cloudy, some discolouration | 262 |
| 16 | ----do---- | 1.12 | Sulphurous acid (as SO$_2$) | 0.44 | 54 | Cloudy; contains precipitated sulphur. | 258 |
| 17 | ----do---- | 0.084 | Phosphorous acid | 0.042 | 103 | Clear; almost colourless | 264 |

Polymers No. 2, 3, 12 and 17 were melt spun at 290° C., the rates of extrusion and wind-up being controlled to give filaments which, when drawn to 3.65 times their original length over a heated pin, were approximately 2 denier. 50 denier multifilament was then used in our tests which gave the following results:

| No. | Tenacity and Extensibility | Dye Uptake—Dispersed Acetate Dyestuff | Dye Uptake—Basic Dyestuff (Malachite Green) |
|---|---|---|---|
| 2 | 2.9 grams per denier/25% | 22 mgm./gm. Fibre | Very good. |
| 3 | 3.1 grams per denier/25% | 12 mgm./gm. Fibre | Good. |
| 12 | 3.3 grams per denier/25% | 14 mgm./gm. Fibre | Do. |
| 17 | >3 grams per denier/25% | <3 mgm./gm. Fibre | Nil. |

EXAMPLE 18

Dimethyl terephthalate (120 parts) and 1:4-butanediol (210 parts) were reacted at the boil in the presence of calcium acetate-1H$_2$O (1.12 parts). Evolution of methanol (together with by-product tetrahydrofuran) was rapid, the theoretical amount being distilled in 50 minutes. Specific gravity measurements were used to follow the methanol/tetrahydrofuran ratio in the distillate. Methyl 3:5-di(carbomethoxy)benzene sulphonate (1.82 parts) was then stirred in and followed shortly afterwards by litharge (0.06 part). Polycondensation at 260° C. and 0.05 mm. Hg pressure for 90 minutes yielded polytetramethylene terephthalate of intrinsic viscosity 0.52, softening point 218° C. and good clarity. When pressed into

Table A

| Expt. No. | Ester-interchange catalyst | Parts | Additive | Parts | Ester-interchange time (minutes) | Polyethylene terephthalate Appearance | Softening point (° C.) |
|---|---|---|---|---|---|---|---|
| 1 | Calcium acetate-1H$_2$O | 1.12 | 3:5-di(carbomethoxy) benzene sulfonic acid. | 3.5 | 52 | Clear, slightly yellow | 197 |
| 2 | ----do---- | 1.12 | ----do---- | 2.6 | 49 | ----do---- | 225 |
| 3 | ----do---- | 1.12 | ----do---- | 1.75 | 46 | ----do---- | 250 |
| 4 | ----do---- | 2.24 | ----do---- | 3.5 | 43 | Clear, almost colourless. | 253 |
| 5 | ----do---- | 2.24 | Methyl 3:5-di(carbomethoxy) benzene sulfonate. | 3.65 | 43 | ----do---- | 255 |
| 6 | Calcium oxide | 0.72 | ----do---- | 3.5 | 60 | ----do---- | 249 |
| 7 | Calcium acetate-1H$_2$O | 1.12 | Para-carbomethoxy benzene sulphonic acid. | 1.4 | 42 | Some cloudiness | 257 |
| 8 | ----do---- | 2.24 | 3:5-dicarboxy benzene sulphonic acid | 3.14 | 40 | Clear, slightly yellow | 248 |
| 9 | Barium acetate-1H$_2$O | 1.73 | Para-carboxy benzene sulphonic acid | 1.3 | 76 | Some cloudiness | 260 |
| 10 | Calcium acetate-1H$_2$O | 1.12 | Para-carboxy benzene phosphonic acid | 1.1 | 45 | ----do---- | 259 |
| 11 | ----do---- | 2.24 | Di(p-carbomethoxyphenyl) phosphinic acid. | 7.7 | 40 | Clear, good colour | 250 |
| 12 | ----do---- | 1.2 | Methyl di-(p-carbomethoxyphenyl) phosphinate. | 4.0 | 40 | ----do---- | 253 | the form of a thin film this polymer showed marked affinity for Malachite Green.

EXAMPLE 19

The conditions of experiment 3 were repeated except that the 120 parts dimethyl terephthalate were replaced by a mixture of 60 parts dimethyl terephthalate and 102 parts 1:2-di(p-carbomethoxyphenoxy)ethane. The resultant copolyester was a good clear colour and by the spinning procedure already described yielded fibres having tenacity 3.4 grams per denier and extension to break 10.6%. These fibres took up 25 milligrams of a dispersed acetate dyestuff (Dispersol Fast Scarlet) per gram and showed good affinity for Malachite Green.

What we claim is:

1. An improved process for the manufacture of highly polymeric polyesters of terephthalic acid which comprises reacting a member of the group consisting of the dialkyl ester of terephthalic acid and mixtures of it with a dialkyl ester of a di(carboalkoxyphenoxy) alkane, with at least one glycol of the series $$HO(CH_2)_nOH$$

where $n$ is greater than 1 but does not exceed 10, in the presence of an alkaline earth metal compound as an ester interchange catalyst, to form an ester interchange product, adding, after completion of the ester interchange reaction, a second compound having a formula selected from the group consisting of

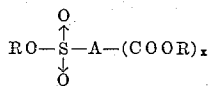

and

in which A is phenylene, R is a member of the group consisting of hydrogen and alkyl, $x$ and $n'$ are integers selected from the group consisting of 1 and 2 and $m=3-n'$, in an amount sufficient to convert said second compound to a salt of the alkaline earth metal moiety of said ester interchange catalyst and prevent deposition of insoluble salts of said alkaline earth metal moiety, the amount of said second compound being not greater than the amount required to convert said alkaline earth metal to said salt of said second compound, and polycondensing said ester interchange product to a highly polymeric polyester in the presence of a polycondensation catalyst.

2. A process according to claim 1 wherein the di(carboalkoxyphenoxy)alkane is 1:2-di(p-carbomethoxyphenoxy)ethane.

3. A process according to claim 1 in which said second compound is di(carboxyphenyl)phosphinic acid.

4. A process according to claim 1 wherein said second compound is an alkyl ester of di(carboxyphenyl)phosphinic acid.

5. A process according to claim 4 wherein the added substance is methyl di(para-carbomethoxyphenyl)phosphinate.

6. A process according to claim 1 wherein said second compound is dicarboxybenzene sulfonic acid.

7. A process according to claim 1 wherein said second compound is an alkyl ester of dicarboxybenzene sulfonic acid.

8. A process according to claim 7 wherein the added substance is methyl 3:5-dicarbomethoxybenzene sulphonate.

9. A process according to claim 1 in which, in the alkaline earth metal compound, the alkaline earth metal is calcium.

10. A process according to claim 7 wherein the alkaline earth metal compound is calcium acetate.

11. A process according to claim 1 wherein the alkaline earth metal compound is present in an amount sufficient to give a concentration of at least 0.1 mole percent of alkaline earth metal in said highly polymeric polyester.

12. A process according to claim 1 wherein the polycondensation catalyst is an oxide of antimony.

13. A process according to claim 1 wherein copolyesters based on polymethylene terephthalates are obtained by the incorporation in the ester-interchange reaction, of more than 1 glycol.

References Cited by the Examiner
UNITED STATES PATENTS

| | | | |
|---|---|---|---|
| 2,035,578 | 3/36 | Wagner | 260—75 |
| 2,921,051 | 1/60 | Amborski et al. | 260—75 |
| 3,018,272 | 1/62 | Griffing | 260—75 |
| 3,033,824 | 5/62 | Huffman | 260—75 |
| 3,052,653 | 9/62 | Iannicelli | 260—75 |

FOREIGN PATENTS

| | | |
|---|---|---|
| 549,179 | 7/56 | Belgium. |
| 568,816 | 12/58 | Belgium. |

WILLIAM H. SHORT, *Primary Examiner.*

MILTON STERMAN, H. N. BURSTEIN, *Examiners.*